July 24, 1962 W. F. CLEMENCY 3,046,354

LOUD SPEAKING TELEPHONE

Filed Dec. 29, 1958

INVENTOR
W. F. CLEMENCY
BY John C. Wagner
ATTORNEY

United States Patent Office 3,046,354
Patented July 24, 1962

3,046,354
LOUD SPEAKING TELEPHONE
William F. Clemency, Murray Hill, N.J., assignor to Bell Telephone Laboratories, Incorporated, New York, N.Y., a corporation of New York
Filed Dec. 29, 1958, Ser. No. 783,417
6 Claims. (Cl. 179—81)

This invention relates to loud speaking telephone apparatus and more particularly to such apparatus employing automatic volume or gain adjustment in the transmitting and receiving channels responsive to the presence or absence of speech energy of one of the channels, i.e., voice-switching control systems.

Heretofore loud speaking telephone apparatus designers have long faced the problem of acoustic feedback or singing in apparatus having two simultaneously operative speech channels. Various proposals for minimizing this detrimental effect have been made. By and large, the most successful approach to the minimization of singing has been the use of automatic gain adjustment in the transmitter or outgoing and the loudspeaker or incoming channel. Such schemes have commonly involved the use of variable amplification vacuum tubes subject to a control potential which is derived from signal energy in a voice channel.

The establishment of voice switching, per se, although theoretically reducing the likelihood of singing at the substation, has produced attendant problems such as speech clipping due to the time delay in operation of the control circuit, singing encountered upon a severe unbalance in the telephone line impedance during transient conditions of switching and variations in balance of the signal levels due to the component variations in the set itself as well as variations in the line impedance with various transmission loops. These attendant difficulties have given rise to the addition of gain-modifying circuits, circuits for disabling portions of the transmission channels during transient conditions as well as other modifications. Attempts to eliminate such problems by additional circuitry have in some cases resulted in voice-switched loud speaking telephone sets of such complexity as to be limited in economic utility due to the high initial cost and difficulty of maintenance. Furthermore, with additional complexity it is sometimes encountered that certain of the sets allow use of the apparatus only in connection with other identical apparatus. Such equipment, although useful for intercommunication service, is of little value for use in telephone systems in which the nature of the apparatus and the telephone loop conditions vary from connection to connection. On the other hand other apparatus has such a fine degree of control that two similar sets simultaneously forming a transmission loop interconnect to produce lockout conditions under which neither channel is fully operative.

With this state of the art in mind, it is a general object of this invention to improve voice switched loud-speaking telephone apparatus. More specific objects of this invention are to minimize or eliminate the above-described difficulties with a simple straightforward stable design employing solid state devices.

Another object of this invention is to provide loudspeaker telephone apparatus which is readily usable over virtually any telephone communication loop including any type of substation apparatus.

Another object of this invention is to enhance the naturalness of transmission by affording a variable degree of gain switching with the level of the incoming energy.

Another object of this invention is to provide freedom from interruption of the speech by background or line noises.

These objects are accomplished in accordance with this invention, one embodiment of which comprises a loud speaking telephone set including a telephone transmitter, a transmitter amplifier and a variable loss network constituting the transmitting channel connected to a two-wire telephone line via a conventional hybrid coil having an associated balancing impedance network, a receiving channel including a receiving amplifier, a variable loss network and a loudspeaker all similarly connected to the telephone line through the hybrid coil.

The variable loss networks in the transmitting and receiving channels include varistor elements having resistance characteristics which vary inversely with the magnitude of direct current flowing therethrough. The varistor network in the transmitting channel is connected to produce a reduction in the loss of that channel in the presence of direct current flow through the varistors while the receiving channel varistor network is connected so as to increase the loss inserted in the receiving channel in presence of direct current flow through the varistors.

The current for controlling the varistor networks is derived from speech currents in the transmitting channel, i.e., amplified and rectified voice signals. The control circuit through which the direct current for controlling purposes flows includes a capacitor for the minimization of speech clipping during switching and also includes a solid state breakdown diode, i.e., having a discontinuous characteristic whereby the threshold level of voice-switching operation is established. Connected to the control circuit is another solid state device, a transistor direct current switch connected to a visual indicator which shows by illumination when the current in the control circuit exceeds the control threshold.

The receiving channel includes a switchguard circuit by means of which incoming energy is rectified and applied to disable the control circuit. This is accomplished through a transistor operated as a switch with its emitter electrode connected to the junction of the capacitor and breakdown diode in the control current path, the collector electrode of the device is connected to the other side of the capacitor, and signal currents in the incoming channel are applied between base and emitter electrodes of the transistor.

In the receiving channel a gain control in the form of a balanced potentiometer is connected across the input conductors. This potentiometer affords the manual adjustment of gain in the incoming channel. Mechanically coupled to the balanced potentiometer for simultaneous adjustment is an additional potentiometer controlling a direct current supply for the control circuit for varying the current level of the control circuit.

The latter direct current supply also is connected to provide continuously a fixed bias for the control circuit to establish an incoming signal threshold.

One feature of this invention involves the presence of networks including solid state devices whose alternating current impedances are sensitive to direct current in the transmitting and receiving branches of the loud speaking telephone for varying the gain of the channels.

Another feature of this invention relates to the gain controlling networks having inverse current impedance relationships whereby a common control current may be used to produce voice current induced switching in both transmit and receive channels.

Still another feature of this invention is based upon the fact that the control current is derived from the normally disabled transmitting circuit for converting the installation from receiving to transmitting condition and that a switchguard disabling the control circuit is responsive to energy in the receiving circuit.

One further feature arises from the addition of means for controllably varying the level of the received signal and further controlling the amount of gain switched to allow adjustment for varying transmission conditions.

And still another feature of this invention relates to the presence of a current source for establishing a threshold for the incoming energy and means for automatically diverting the current in the presence of incoming energy above the threshold.

A more complete understanding of this invention may be had from the following detailed description with reference to the accompanying drawing in which.

Figure 1:
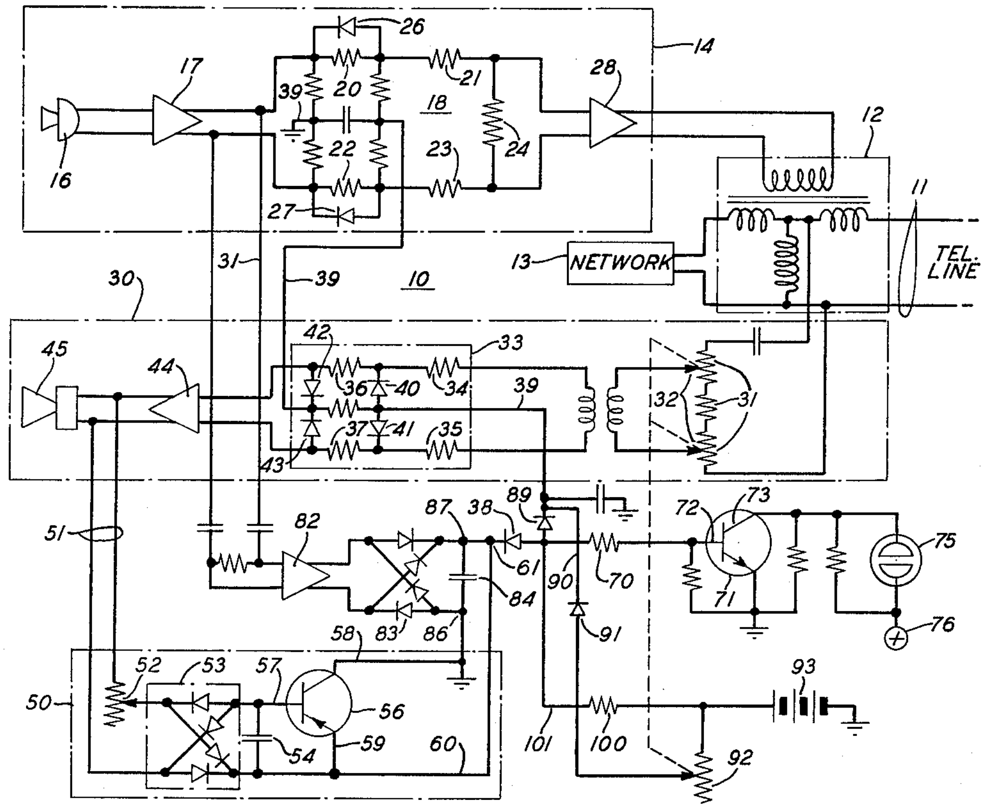
FIG. 1 is an electrical schematic representation of this invention.

Referring now to FIG. 1, loud speaking telephone apparatus 10 of this invention is connected to a telephone line 11 and thence through a telephone central office not shown in the drawing to another telephone substation which may be of the conventional type telephone or similar loud speaking apparatus. Joining the apparatus to the telephone line 11 is a conventional hybrid coil 12 terminating in a line balancing network 13 whose impedance is altered by the direct current from the line so that it affords an automatic compensation for variations in the impedance looking into the telephone line 11 as is conventional in telephone practice. Connected to one winding of the hybrid coil is the transmitting channel 14 comprising a telephone transmitter 16 connected to an amplifier 17 which may have normally fixed gain. The output leads of amplifier 17 are connected to a variable loss network 18 having resistive elements 20, 21, 22 and 23 in series with the channel conductors, a shunt resistor 24 and varistor elements 26 and 27 connected in parallel with the resistor elements 20 and 22, respectively. The output of the variable loss network 18 is connected to the hybrid coil 12 through a second amplifier stage 28 which provides additional fixed gain.

The receiving channel 30 of the loud speaking telephone apparatus is shunted by a balanced potentiometer having resistance 31 and wiper arms 32 indicated by arrows which afford the introduction of identical resistance to both conductors of the receiving channel 30. The wiper arms 32 constitute the input connections to the receiving channel variable loss network 33 through an isolating transformer. This network 33 comprises resistance arms 34, 35, 36 and 37 in series with the incoming channel conductor and oppositely poled varistors 40 and 41 across the input side of the resistance arms 36 and 37. The output side of the receiving channel of the resistances 36 and 37 includes oppositely poled varistors 42 and 43 thereacross and is connected to a fixed gain amplifier 44. Coupled to the amplifier 44 is a loudspeaker 45 which reproduces in amplified form the signals which are received at the substation over the telephone line 11.

Connected in the transmitting channel between the amplifier 17 and the loss network 18 is a conductor 31 through which a sample of the amplified local speech is conducted to a control amplifier 82, the output of which is connected to a full wave rectifier 83. A capacitor 84 which provides both filtering and a time delay is connected across the output of the rectifier 83 with one electrode 86 connected to the negative pole of the rectifier 83 grounded. The positive electrode 87 of capacitor 84 is connected to a breakdown or Zener diode 38 having the characteristic that it will not conduct current until the voltage thereacross exceeds a minimum value, which in one preferred embodiment is 6 volts. The opposite pole of the diode 38 forms the input to the control path 39 through a forwardly poled diode 89 and the variable loss networks 33 and 18 in that order. This control path 39 supplies the loss controlling current for the varistor elements 40, 41, 42 and 43 in the receiving variable loss network 33 and varistors 26 and 27 in the transmit variable loss network 18. The shunt varistors 40, 41, 42 and 43 of the network 33 assume their low impedance condition in the presence of direct current flow in conductor 39. With current flowing in conductor 39 incoming signals are attenuated prior to reaching the amplifier 44 up to 50 decibels depending upon the value of the control current.

The network 18 includes the current responsive varistors 26 and 27 each shunting respective series arm resistances 20 and 22. In the presence of direct current in the control conductor 39 the varistors 26 and 27 become low impedance shunts for the series arm resistances 20 and 22 thereby lowering the attenuation of the outgoing signal at that point.

The apparatus described above comprises a complete voice-switched loud speaking telephone having a receiving channel 30 which is normally substantially operative and a transmitting channel 14 which is normally inoperative, plus a circuit responsive to local speech for inversely altering the condition of the channels. The normal condition for this purpose is one in which no current is flowing in the control conductor 39 from the control rectifier 83, whereupon the loss network 18 is in its high impedance condition while loss network 33 is in its low impedance condition. This apparatus, however, allows the interruption of the incoming channel signal by sound energy at the telephone transmitter due to acoustic coupling to the loudspeaker, room noise at the location of the apparatus, and local speech of a low volume. Although occasions exist wherein it is desirable for the subscriber to be able to interrupt the incoming signal, its attenuation due to coupling of the loudspeaker to the transmitter and room noise is not desired. Therefore, a portion of the incoming signal applied to the loudspeaker terminals is sampled and introduced into a switchguard circuit 50 via a pair of conductors 51. The switchguard 50 includes a rheostat 52 for varying the level of the guard action, a full wave rectifier 53, a capacitor 54 which, similar to capacitor 84, provides both filter action and time delay and a transistor 56 operated as a switch. The capacitor 54 is connected across the base 57 and emitter 59 of transistor 56. The collector is connected to one side of capacitor 84 and the emitter 59 connected via a conductor 60 to the junction 61 of the capacitor 84 and the breakdown diode 38. The switchguard 50 provides a short circuit to ground across capacitor 84 in the presence of signal energy in the incoming channel and thereby prevents the establishment of a voltage across capacitor 84 of sufficient level to overcome the voltage drop in diode 38 and the energizing of the control path through conductor 39. The rheostat 52 allows the adjustment of the effectiveness of the switchguard 50 so as to avoid the disablement of the control circuit altogether thereby making it possible to break into incoming transmissions. The control path through conductor 39 also includes an indicator circuit made up of a resistor 70 in series between junction 61 and the base 72 of a grounded emitter transistor 71.

A neon lamp 75 which functions as a transmitting circuit voice level indicator is connected between the collector 73 of transistor 71 and a power supply 76. When the transistor 71 is in its high impedance condition, i.e., when no base current flows, the voltage across the lamp 75 is insufficient to cause it to light. Whenever sufficient current flows in the control path through conductor 39 and the base circuit of transistor 73, the emitter-collector circuit of transistor 73 assumes a low impedance condition and substantially the entire voltage of the power supply 76 is applied across neon lamp 75 sufficient to cause lamp 75 to light.

One further connection to the control conductor 39 includes the conductor 90, blocking diode 91, a rheostat 92 and battery 93 connected to ground. This branch constitutes an additional source of direct current for the control conductor 39. The wiper arm of the rheostat 92 is mechanically coupled to those arms 32 of the incoming gain control. This branch is isolated from the threshold determining diode 38 by the blocking diode 89. With this arrangement the adjustment of the level of the incoming signal by the subscriber also adjusts the amount of the loss which is switched. Therefore, when the telephone set is connected over a short loop which provides incoming energy at a high level, the subscriber's adjustment of the incoming channel gain to a lower level also decreases the amount of loss switched in the channels. This is accomplished by the component of direct current introduced into the control conductor 39 from the battery 93. This current component serves to reduce the resistance of the varistor elements 26, 27, 40, 41, 42 and 43 during quiescent periods.

In the embodiment shown in FIG. 1, the loss control 92 appears mechanically coupled to the wiper arms 32 of the incoming gain control whereby the simultaneous adjustment of the incoming signal level and the amount of loss switched is achieved. It is clear from an understanding of the operation of the rheostat 92 that it actually also controls the level of the incoming signal. For example, when the rheostat 92 is adjusted to a minimum resistance condition and current is drawn from battery 93 and applied through diode 91 through the control path 39, the current in control path 39 effects a partial switching of loss from the outgoing channel 14 to the incoming channel. In the absence of outgoing speech, the change in loss level in the outgoing channel has no direct effect but the increase in loss in the incoming channel effects a reduction in the incoming signal level. Therefore, employing the control 92 it is possible to eliminate the incoming gain control resistances 31 and connect the incoming channel directly to the hybrid coil 12. However, in the interest of completeness the embodiment of FIG. 1 shows the presence of both the incoming channel gain control and the switching loss control.

The battery 93 also supplies a second component of direct current to the control circuit as determined by the value of a resistor 100 connected between the battery 93 and the control conductor 39 without any blocking diode such as the diode 89 associated with the loss control 92 circuit. A constant drain or fixed bias is introduced through the resistor 100 and conductor 101 into the control circuit. This current produces an imperceptible degree of switching of loss in the transmitting channel but in the receiving channel the change in loss is in the order of 10 decibels inserted in that channel. The difference in effect is due to the slightly different characteristics of the receiving and transmitting variolossers in the region of low control currents as may be seen from the curves of FIGS. 2 and 3.

In switching from the normally receiving to the transmitting condition this fixed bias has no significant effect. However, in the presence of incoming energy which exceeds the nominal level to overcome the 10 decibel loss, the energy reaching the input to the loudspeaker 45 disables the control circuit by means of the switchguard transistor 56 and simultaneously by the same action diverts the fixed bias current. This latter is accomplished as the transistor 56 assumes its low impedance condition and effectively applies a short circuit across the capacitor 84. The current flowing from the battery 93 through resistor 100 and conductor 101 has a low impedance path to ground through the diode 38, conductor 60, and the emitter-collector circuit of transistor 56. This removes the initial 10 decibel loss in the receiving channel leaving the receiving channel with full gain.

In operation, the establishment of a call is accomplished by a dial mounted in a handset telephone set and arranged to operate with either the handset telephone or with the apparatus of this invention. Switching this apparatus in place of the normal telephone set, the subscriber, by speaking, conditions his outgoing channel 14 and his speech is thereby amplified and transmitted over the telephone line 11 to the other party. During this period the indicator lamp 75 is lighted and indicates to the subscriber that his apparatus is in transmitting condition. The transmitting channel 14 is conditioned for transmission in a matter of milliseconds after the commencement of speech during which time the capacitor 84 is charged to a voltage sufficient to exceed the threshold of the diode 38 and cause it to conduct. The rectified speech currents in the conductor 39 produce a smooth continuous adjustment in the gain of both channels simultaneously. Continued speech maintains the capacitor 84 in a charged condition and the apparatus in the transmitting condition. Upon the receipt of signal currents in the incoming channel during the period in which the capacitor is not charged the switchguard 50 produces a short circuit across the capacitor 84. Depending upon the loop impedance, the line of the receiving channel will vary. By the subscriber normal gain control, the signal level will be varied and the loss switched simultaneously controlled.

Transient conditions during connection do not affect voice switching or produce singing in this apparatus since the apparatus is normally conditioned for reception and the received signal never produces a change in the status of the channels directly but only by disabling the control circuit. Similarly, lock-out of the transmission channel of two loudspeaker telephones connected to a common loop does not occur since both are normally conditioned for reception and either telephone set receiving incoming signal energy prior to the establishment of outgoing signal energy at a level and having duration sufficient to charge the capacitor 84 to the threshold level of diode 38 will maintain the apparatus in receiving condition.

Figure 2:
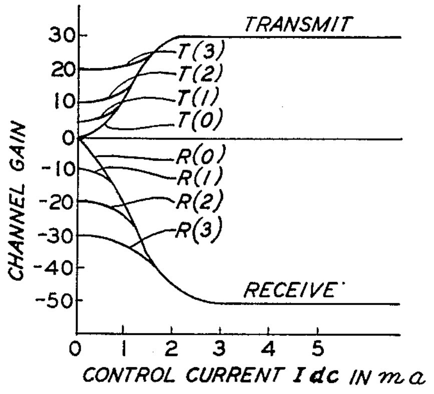
FIG. 2 is a graphical representation of the condition of the transmitting and receiving channels under various conditions of control.
Figure 3:
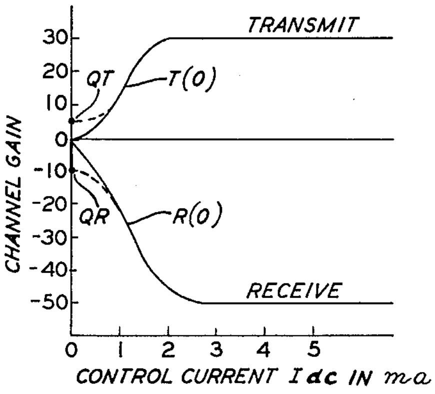
FIG. 3 is a graphical representation of the channel conditions as affected by the local control current source.

For an understanding of the channel levels and the controls, therefore, reference is now made to FIGS. 2 and 3 in which the ordinate scale is the gain of the channels about the quiescent condition labeled as zero. The abscissa is a function of the direct current entering the switching control path 39 from the control rectifier 83. The overall gain of the apparatus may be obtained by constructing a vertical line anywhere along the direct current axis between curves T(0) and R(0). For example, with direct current of 5 milliamperes, the gain in the receiving channel is 50 decibels below and the gain of the transmitting channel is approximately 30 decibels above the quiescent condition. As the current is increased by speech energy at the transmitter 16, the quantity of loss in the two channels is varied simultaneously. At all stages of switching, or in other words, along all vertical lines in the drawing FIG. 2, the summation of channel gains is always negative since a positive condition would constitute the conditions for acoustic feedback or singing. With a higher setting of rheostat 92 where direct current is supplied from battery 93, the transmitting channel gain varies from an initial value of approximately 5 decibels to a final value of 30 decibels (Curve T(1)) and the receiving channel gain varies from −10 decibels to approximately −50 decibels. Upon shorter high gain loops with adjustment of the receiving channel volume control so that the loss control 92 is in its lowest voltage drop position, additional current is supplied by the battery 93 to the control conductor 39. Then the range of gain in the transmitting channel varies from 12 to 30 decibels (Curve T(2)) and in the receiving channel from −20 to −50 decibels. An even higher current setting results in the characteristic curves T(3) and R(3).

The effect of the direct current path from the battery 93 through the resistor 100 is apparent from FIG. 3. The small current introduced into the control path 39 from that source inserts approximately 10 decibels of loss into the receiving channel and removes approximately 2 decibels from the transmitting channel so that under quiescent conditions the apparatus rests with the channels in the states indicated by the points $Q_r$ and $Q_t$. When the apparatus switches to the transmit condition from the quiescent, the change in gain is along the dotted lines from those points until the solid lines T(θ) and R(θ) are intersected and then continues along the solid lines. The change of 2 decibels in the transmitting channel gain does not have any appreciable effect but the initial 10 decibels of receiving channel loss requires that the incoming signal necessary to disable the control circuit be of sufficient level to overcome that loss. This prevents the unwanted lockout of the transmitting channel by background noise at the distant station or by line noise of the telephone connection. In the presence of incoming energy the condition of the receiving channel gain is changed from that indicated by point Qr moving up to the axis. When the apparatus switches from receiving to transmitting the channel condition varies from the axis along the solid curves R(θ) and T(θ).

From the above description it may be seen that this invention is characterized by simplicity, as compared with prior art voice switched loud speaking telephones, almost exclusive use of solid state devices in the control circuitry and, despite the simplicity, allows a marked degree of freedom of control by the subscriber allowing him to control the incoming gain and simultaneously control the quantity of gain switched in operation. This invention also provides threshold establishing means in both the outgoing and incoming channel and means for rapidly disabling both threshold means during periods when the threshold is unneeded.

It can be appreciated that the above-described arrangements are merely illustrations of the principles of the invention. Numerous other arrangements and modifications may be devised by one skilled in the art without departing from the spirit and scope of the invention.

What is claimed is:

1. Loud speaking telephone apparatus comprising an incoming channel including a first variable impedance network and a loudspeaker, an outgoing channel including a microphone and a second variable impedance network, circuit means common to said networks for controlling the impedance of each of said networks, said networks being arranged in such manner that current flows through them simultaneously to vary the impedances thereof simultaneously, the impedance of one of said networks being varied inversely with respect to the impedance of the other of said networks by the flow of current therethrough through said circuit means, means for deriving a first unidirectional voltage from speech energy in said outgoing channel, means for establishing a threshold for said unidirectional voltage, means for impressing said unidirectional voltage on said threshold means, means for introducing the current passing through said threshold means into said variable impedance networks simultaneously through said circuit means, means for deriving a second unidirectional voltage from speech energy in said incoming channel, means responsive to said second unidirectional voltage for preventing the level of said first unidirectional voltage from reaching the conduction level of said threshold means, thereby rendering ineffective the control of said variable impedance networks through said circuit means in the presence of incoming signals.

2. Loud speaking telephone apparatus comprising an incoming channel including a first variable impedance network and a loudspeaker, an outgoing channel including a microphone and a second variable impedance network, circuit means common to said networks for controlling the impedance of each of said networks, said networks being arranged in such manner that current flows through them simultaneously to vary the impedances thereof simultaneously, the impedance of one of said networks being varied inversely with respect to the impedance of the other of said networks by the flow of current therethrough through said circuit means, means for deriving a unidirectional voltage from speech energy in said outgoing channel, a capacitor across which said unidirectional voltage is applied, means connected to said capacitor for establishing a threshold for said unidirectional voltage, means for introducing the current passing through said threshold means into said variable impedance networks simultaneously through said circuit means, means for deriving a unidirectional voltage from speech energy in said incoming channel, means repsonsive to said voltage for preventing the voltage across said capacitor from reaching the conduction level of said threshold means thereby rendering ineffective the control of said variable impedance networks through said circuit means in the presence of incoming signals.

3. Loud speaking telephone apparatus in accordance with claim 2 comprising means for controlling the impedance introduced into said incoming and outgoing channels by said variable impedance networks when said channels are in the quiescent or nontransmitting condition, said means comprising a direct current source and a manually controlled variable impedance means connecting said source to said circuit means for introducing direct current from said source into said circuit means.

4. Loud speaking telephone apparatus in accordance with claim 2 comprising means for simultaneously varying the gain of said incoming channel and controlling the impedance introduced into said incoming and outgoing channels by said variable impedance networks when said channels are in the quiescent or nontransmitting condition, said means comprising a direct current source and a first manually controlled variable impedance means connecting said source said circuit means for introducing direct current from said source into said circuit means, and a second manually controlled variable impedance means disposed in said incoming channel.

5. Loud speaking telephone apparatus in accordance with claim 2 comprising means for controlling the impedance introduced into said incoming and outgoing channels by said variable impedance networks when said channels are in the quiescent or nontransmitting condition, said means comprising a direct current source and a substantially constant impedance means connecting said source and said circuit means for introducing a substantially constant direct current bias from said source into said circuit means, and means responsive to said unidirectional voltage derived from speech energy in said incoming channel for disabling said direct current bias producing means in the presence of incoming signals.

6. Loud speaking telephone apparatus in accordance with claim 2 wherein the means responsive to the unidirectional voltage derived from speech energy in said incoming channel comprises a transistor having base, emitter and collector electrodes, said emitter and collector electrodes being effectively connected across said capacitor, said base and emitter electrodes being connected to the means for deriving the unidirectional voltage from speech energy in the incoming channel.

References Cited in the file of this patent

UNITED STATES PATENTS

| | | |
|---|---|---|
| 2,129,990 | De Fremery | Sept. 13, 1938 |
| 2,332,430 | Berger | Oct. 19, 1943 |
| 2,370,388 | Baird | Feb. 27, 1945 |
| 2,964,598 | Parker | Dec. 13, 1960 |